United States Patent [19]

Allen et al.

[11] 4,447,001

[45] May 8, 1984

[54] ADJUSTABLY DIMENSIONED UNIFORMLY DISTRIBUTED SOLDER WAVE APPARATUS

[75] Inventors: Melvin K. Allen; Ronald J. Berri, both of Los Angeles; Douglas N. Winther, Garden Grove, all of Calif.

[73] Assignee: Banner/Technical Devices Company, Inc., Culver City, Calif.

[21] Appl. No.: 215,181

[22] Filed: Dec. 11, 1980

[51] Int. Cl.³ .............................................. B23K 3/06
[52] U.S. Cl. ....................................... 228/37; 228/260
[58] Field of Search ........................... 228/37, 260, 36; 118/429; 415/206

[56] References Cited

U.S. PATENT DOCUMENTS

| 3,119,363 | 1/1964 | Rieben | 228/37 |
|---|---|---|---|
| 3,123,084 | 3/1964 | Tardoskeyi | 134/182 |
| 3,151,592 | 10/1964 | Wegener | 228/37 |
| 3,196,829 | 7/1965 | Elliott et al. | 228/37 X |
| 3,198,414 | 8/1965 | Tardoskegyi | 118/429 X |
| 3,216,642 | 11/1965 | De Verter | . |
| 3,322,070 | 5/1967 | Glass | 415/206 |
| 3,398,873 | 8/1968 | Wegener et al. | 29/471.1 |
| 3,430,332 | 3/1969 | Roczey-Koller | . |
| 3,438,386 | 4/1969 | Diggins et al. | 137/154 |
| 3,452,916 | 7/1969 | Andis | 228/36 |
| 3,532,262 | 10/1970 | Laubmeyer et al. | 228/37 |
| 3,565,319 | 2/1971 | Eschenbrucher | 228/37 |
| 3,589,590 | 6/1971 | Fitzsimmons | 228/37 |
| 3,604,611 | 9/1971 | Lamberty | 228/36 |
| 3,605,244 | 9/1971 | Osborne et al. | . |
| 3,610,508 | 10/1971 | Laubmeyer | 228/8 |
| 3,612,388 | 10/1971 | Wegener et al. | 228/34 |
| 3,705,457 | 12/1972 | Tardoskegyi | 228/219 |
| 3,726,465 | 4/1973 | Boynton et al. | 228/37 |
| 3,752,383 | 8/1973 | Allen et al. | . |
| 3,773,242 | 11/1973 | Fitzsimmons | 228/37 |
| 3,921,888 | 11/1975 | Elliott et al. | 228/37 |
| 3,989,180 | 11/1976 | Tardoskegyi | 228/37 |
| 3,990,621 | 11/1976 | Boynton et al. | 228/37 |
| 3,993,235 | 11/1976 | Boynton | 228/37 |
| 4,208,002 | 6/1980 | Comerford et al. | 228/37 |

Primary Examiner—Nicholas P. Godici
Assistant Examiner—M. Jordan
Attorney, Agent, or Firm—Maky, Renner, Otto & Boisselle

[57] ABSTRACT

A solder or other liquid wave forming machine has a solder delivery chamber with a tapered depth profile to deliver solder uniformly from a horizontal stream to plural vertical chambers from which the upwardly flowing solder exits to form a solder wave. The wave has substantially uniform height and contour over its width. A slide valve cooperates with baffles that form the vertical chambers selectively to block flow from a prescribed number of chambers to adjust the width of the solder wave. Curved re-entry baffles direct the flow vector of the solder returning from the wave into a main solder supply tank in a horizontal direction to minimize turbulence at such surface and, thus, the formation and circulation of dross.

40 Claims, 12 Drawing Figures

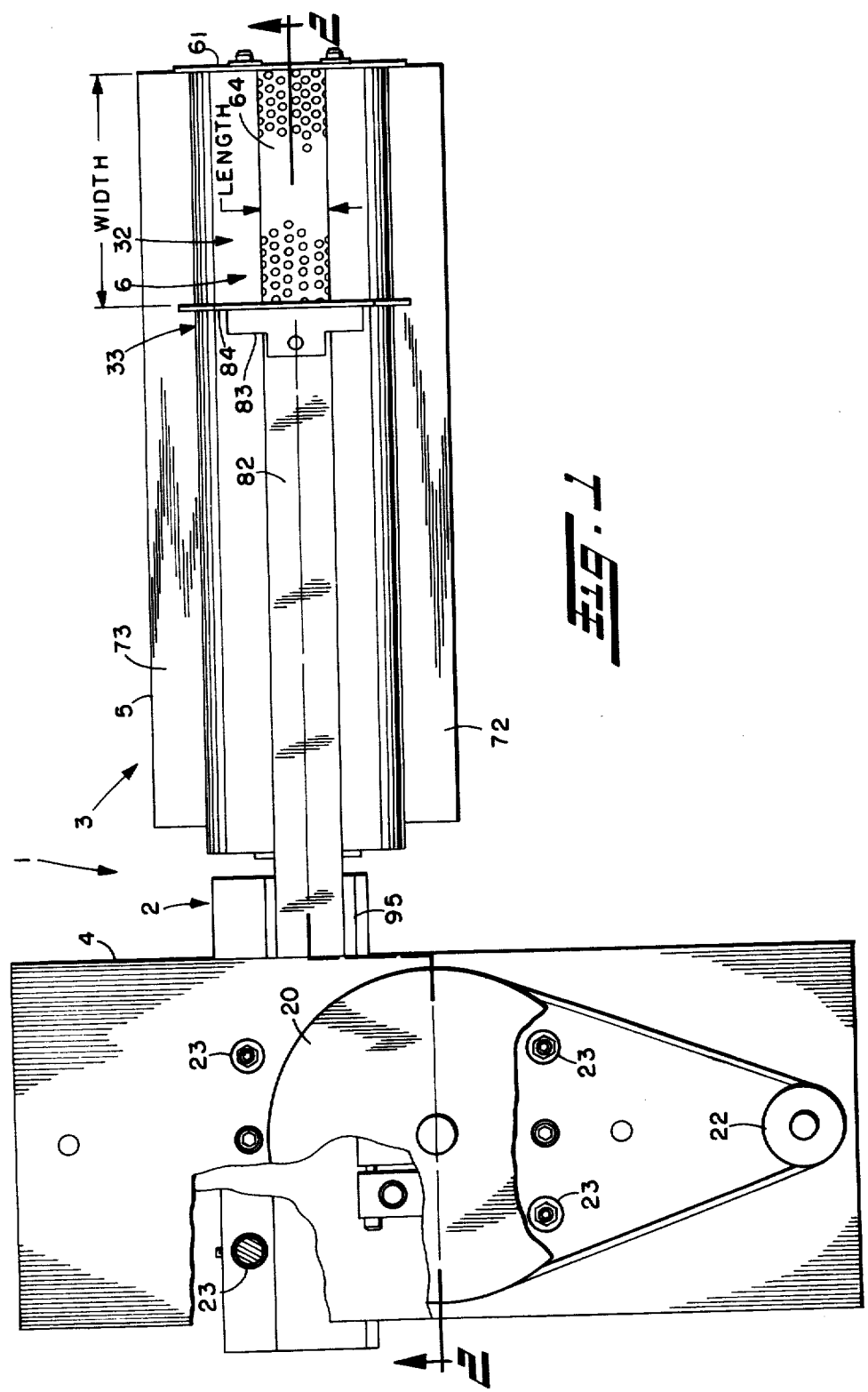

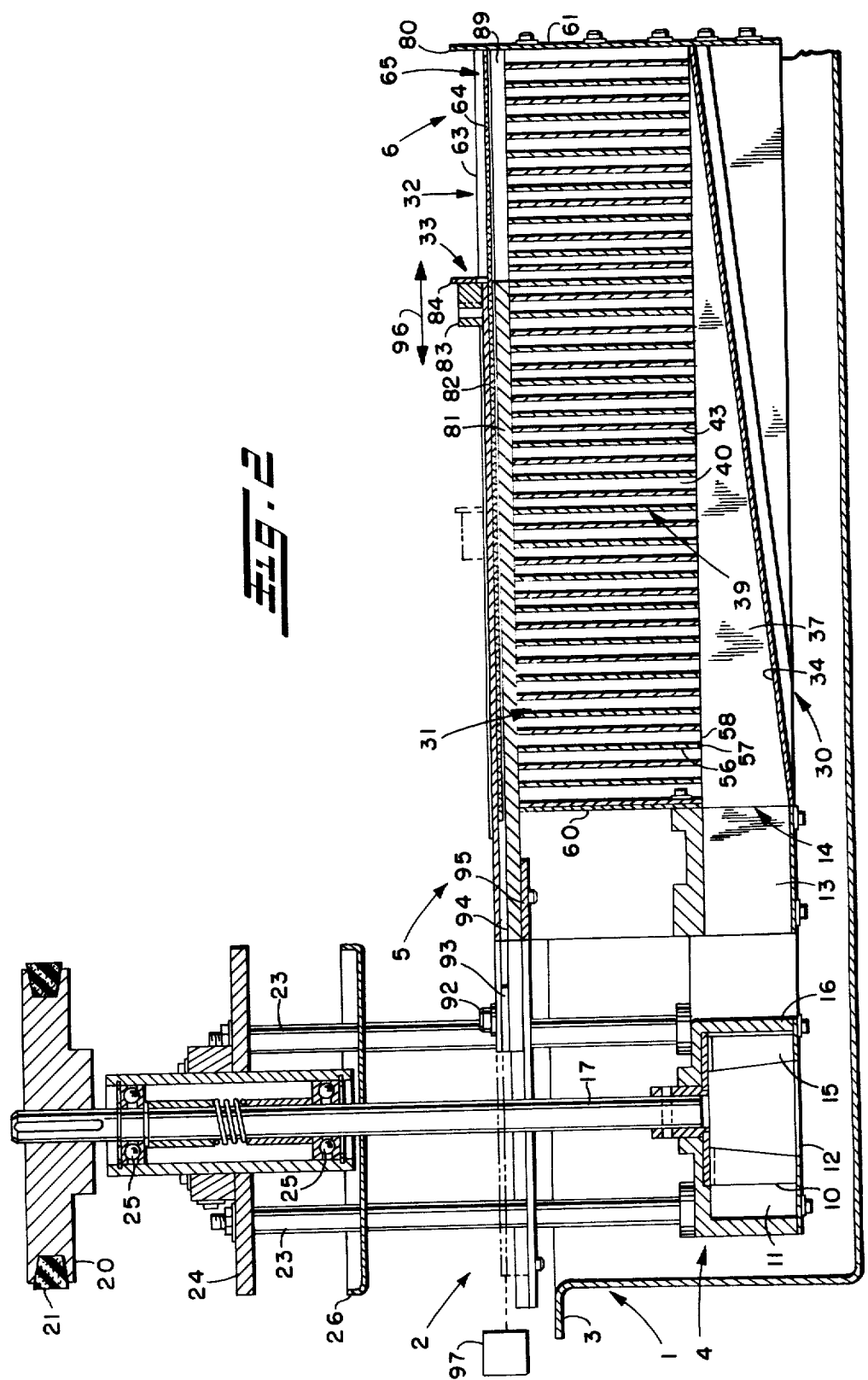

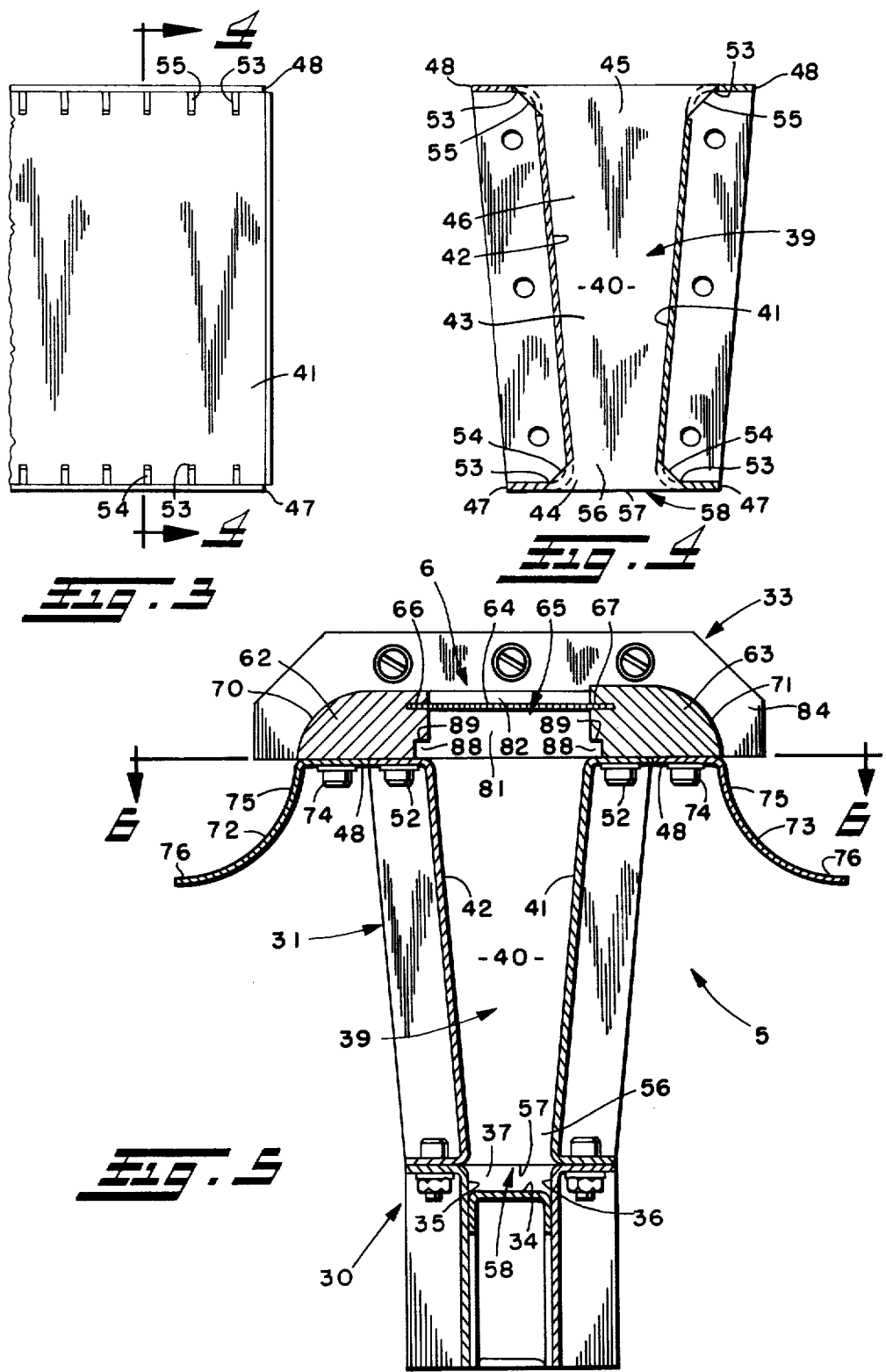

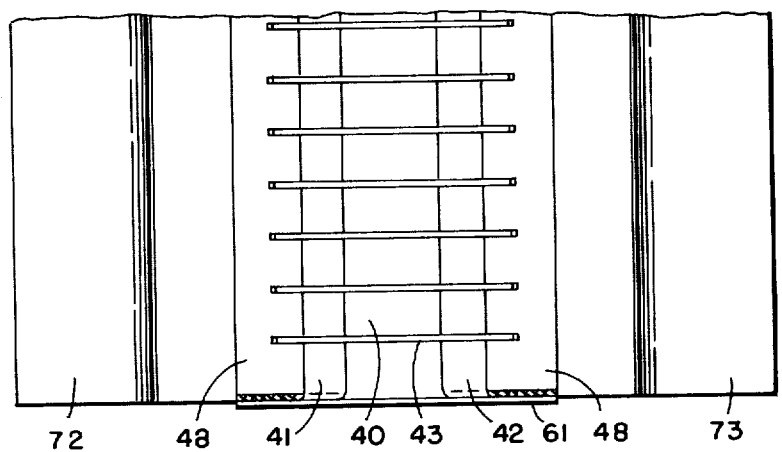
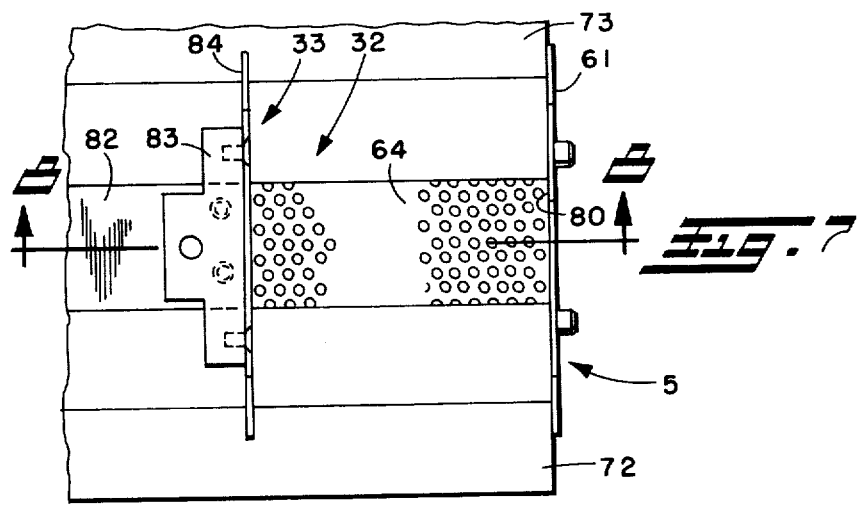
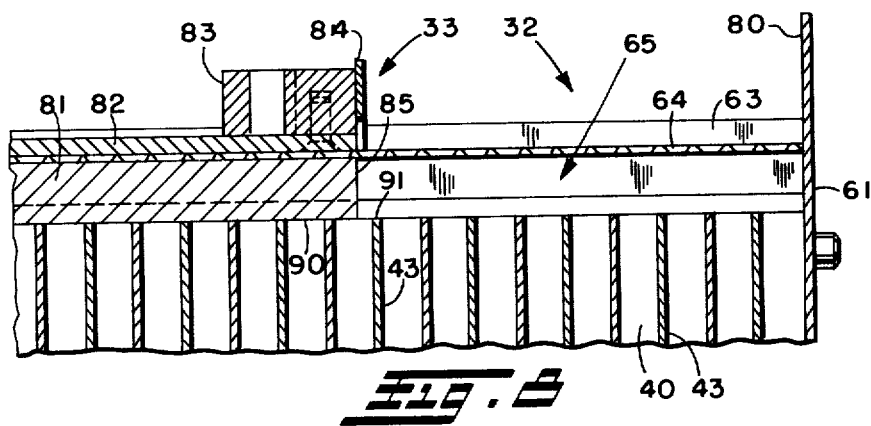

ADJUSTABLY DIMENSIONED UNIFORMLY DISTRIBUTED SOLDER WAVE APPARATUS

TECHNICAL FIELD

The present invention relates generally to liquid wave machines and more particularly to a wave soldering machine or apparatus in which the wave height and contour are substantially uniform and wave width can be adjusted.

BACKGROUND OF THE INVENTION

Wave solder machines are particularly useful to solder expeditiously plural electrical connections on a printed circuit board or the like, as is well known. Typically the circuit board with various components inserted therein is conveyed automatically via fluxing, pre-heating, and/or like pretreating stations ultimately to engage a continuously replenished wave-like formation of molten solder commonly called a solder wave. As the circuit board is conveyed through the solder wave, soldered connections are made. Liquid wave machines also are used for tinning and other purposes. The invention will be described below with reference to a wave solder machine, but it will be understood that the features of the invention may relate equivalently to other liquid wave machines for coating and the like.

A so-called fountain or generator produces the solder wave. The fountain typically is positioned in a main supply tank containing a recirculating supply of molten solder that is pumped through the fountain into the wave and returns from the latter and back into the recirculating solder supply. Propeller and impeller type pumps have been used to pump the solder through the fountain to form the solder wave.

The opening at the top of the fountain is positioned such that its elongated width dimension is transverse to the direction of movement of the printed circuit boards, and the relatively shorter length dimension of such opening at the ends thereof is in a direction approximately parallel to the conveyed direction of the printed circuit board. The relatively narrow ends of the fountain establish side boundaries for the solder wave; the width dimension of the solder wave is considered that dimension between such side boundaries. The fountain may be designed to have the solder wave flow over one or both of the elongate fountain sides; in either case the length dimension of the solder wave is that dimension thereof taken in a direction approximately parallel to the conveyed direction of the printed circuit boards, i.e. parallel to the fountain ends. The height or depth dimension of the solder wave is the height thereof or depth of material thereof above the top of the fountain.

To optimize the soldered connections effected by the wave soldering machine, it is desirable that the solder wave be substantially non-turbulent (wave turbulence increases dross, impurities in the solder) and that the distribution of solder in the solder wave, e.g. the height and contour, be substantially uniform, i.e. the cross-sectional profile of the solder wave looking in a direction transverse to the length thereof should remain substantially uniform in height especially as well as in contour, over the entire width of the solder wave.

Due to the relatively heavy mass or specific gravity of molten solder it has been difficult in the past to redict a horizontally flowing stream of solder to a vertical flow direction in a fountain and still to obtain a uniform distribution of solder in the wave. The flow momentum of the horizontal solder stream would tend to cause the downstream end of the wave to have more solder than the upstream end. Therefore, one or more screens, baffles, tortuous flow paths, and other flow impedances have been used in prior fountains to improve wave uniformity in the solder wave. However, unnecessary energy is consumed to pump the solder through those flow impedances.

The unnecessary consumption of energy to pump and to heat solder in a wave having a width appreciably wider than that of the printed circuit board carried therethrough also is a disadvantage of prior wave soldering machines. In such machines the conveyor may be adjusted or adapted to carry printed circuit boards of different sizes, but the width of the solder wave remains constant so that only a portion thereof actually is used to effect a soldering function when relatively narrow printed circuit boards are soldered.

In prior wave soldering machines the solder flow returning from the wave over the elongate edge of the fountain drops essentially vertically directly into the supply of molten solder contained in the main supply tank. Such vertical dropping effects turbulence in the solder supply causing dross to easily be drawn in by the fountain pump and delivered into the wave. Impingement of dross on the circuit board may cause an undesirable high impedance connection, for example. Accordingly, it is desirable to confine the dross, which normally has a smaller specific gravity than the solder, to the surface of the recirculating supply of solder thereby maintaining the purity of the solder flowing in the solder wave.

BRIEF SUMMARY OF INVENTION

Features of the present invention include reduction of energy required for a soldering machine, particularly a wave soldering machine, uniform distribution of solder in the solder wave, and minimization and/or elimination of dross formation and circulation.

Briefly, one aspect of the invention relates to the efficiently obtained non-turbulent uniform distribution of solder to and flowing in the solder wave, especially as the width of the wave is varied. In accordance with this feature, a solder wave fountain has a plurality of vertical flow chambers for conducting individual streams to the fountain outlet at which the wave is formed and a delivery chamber conducts a horizontal solder stream to such vertical chambers for vertical redirection by the latter. Walls of the vertical flow chambers cooperate with the delivery chamber, which preferably has a relatively decreasing depth profile along the direction of such horizontal solder flow, so that approximately equal amounts of solder of equal kinetic energy characteristics are diverted from the horizontal stream into respective vertical flow chambers.

According to one aspect of the invention the width of a solder wave may be adjustably controlled. Such adjustment allows the solder wave to have a width commensurately adequate to solder printed circuit boards of a given size without the need to pump additional solder to unused portions of a solder wave, thus saving energy. Heat loss at an unused portion of a solder wave also is eliminated so that there is a further energy savings in the amount of heat required to maintain the molten solder at a desired temperature.

In accordance with a further aspect of the invention a curved return sheet, panel or the like returns solder from the wave in a substantially laminar flow to the solder contained in the main supply tank. Preferably such returning laminar flow is directed horizontally at or near the surface of the supply of molten solder thereby minimizing turbulence and the formation and circulation of dross.

With the foregoing in mind, a primary object of the present invention is to provide a liquid wave forming machine, and especially a soldering machine, that is improved in the noted respects.

Another object is to improve the quality of soldered connections made by a soldering machine.

An additional object is to conserve the energy required to operate a wave machine.

A further object is to enable adjustment of the width of a wave.

Still another object is to maintain the uniformity of a wave.

Still an additional object is to enable controlled adjustment of the width of the wave while maintaining uniformity of height and contour of the wave.

Still a further object is to maintain a laminar or a substantially non-turbulent flow in a wave.

Even another object is to minimize the dross in a soldering machine and, more particularly, to optimize purity of the solder in a solder wave.

Even an additional object is to effect the foregoing particularly in a wave soldering machine.

Even a further object is to provide an improved fountain for a wave soldering machine.

Still another object is to provide an improved impeller pump, and one especially suited for soldering machines.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a top plan view, partly broken away, of a pump and fountain assembly for a wave soldering machine in accordance with the present invention;

FIG. 2 is a side elevation, partly in section, view of the pump and fountain assembly looking in the direction of the arrows 2—2 of FIG. 1, with a portion of the main supply tank shown in phantom;

FIG. 3 is a partial side elevation view of the vertical flow baffle chamber assembly of the fountain at the end thereof relatively remote from the pump;

FIG. 4 is a section view of the vertical flow baffle chamber assembly looking generally in a direction of the arrows 4—4 of FIG. 3;

FIG. 5 is a section view of the fountain of FIGS. 1 and 2, including the vertical flow baffle chamber assembly, delivery chamber assembly, fountain outlet, and wave width controlling valve;

FIG. 6 is a partial top view of the fountain looking generally in the direction of the arrows 6—6 of FIG. 5;

FIG. 7 is a partial top plan view of the fountain at the end thereof relatively remote from the pump;

FIG. 8 is a partial section view of the fountain looking generally in the direction of the arrows 8—8 of FIG. 7;

DESCRIPTION OF THE PREFERRED EMBODIMENT

Figure 9:
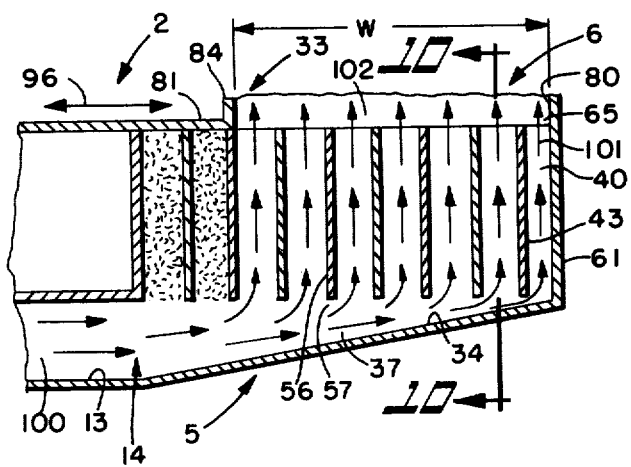
FIGS. 9 and 10 are schematic side and end views of the fountain showing flow therein.

Referring now in detail to the drawings, wherein like reference numerals designate like parts in the several figures, and initially to FIGS. 1 and 2, a wave soldering machine in accordance with the present invention is generally indicated at 1. The wave soldering machine includes a pump and fountain assembly 2 at least part of which is contained within a main supply tank 3 submerged below the lowest anticipated surface level of a supply of molten solder contained in such tank.

In operation of the wave soldering machine 1, molten solder contained in the main supply tank 3 (and maintained molten by heaters, not shown) is pumped by the pump 4 through the fountain 5 to form at the fountain outlet 6 a wave of solder. The majority of flow of solder in the solder wave returns to the supply of molten solder contained in the main supply tank 3 in a manner to be described in greater detail below. However, some of the solder may impinge against the surface of a printed circuit board to effect standard soldering function. The circuit board is conveyed by a conveyor (not shown) through the solder wave in a direction generally into the plane of the drawing of FIG. 2 or vertically relative to the drawing illustrated in FIG. 1. The wave soldering machine 1 may be one part or station of a piece of wave soldering equipment in which there may be several additional stations for fluxing, pre-heating, etc.

The pump 4 preferably is of the impeller type, rather than the propeller or piston type, for obtaining uniform relatively high velocity flow of solder with adequate kinetic energy to flow both along the horizontal and vertical paths thereof as will be further described below. An impeller 10 rotates within an impeller chamber 11 drawing in solder through the impeller inlet 12 from the solder supply contained in the main supply tank 3. The solder is pumped generally horizontally through an outlet coupling passage 13, to the inlet 14 of the fountain 5. The vanes 15 of the impeller 10 are tapered, as is shown, to have a larger surface area or radial dimension transverse to the axis about which the impeller rotates at the upper end than at the lower end thereof. To draw the solder, which has a relatively large mass, to the upper part of the impeller chamber 11 requires more drawing effect or power than that required to draw in solder to a lower portion of the impeller chamber due to well known potential energy consideration. The tapered vanes 15 provide for such drawing effect differential to obtain a desired relatively high volume, substantially uniform profile and non-turbulent flow of the solder stream pumped through the outlet coupling passage 13.

The coupling passage 13 may be an integral part of the impeller pump housing 16. The impeller 10 is mounted to rotate with a rotatable shaft 17, which is turned by a pulley 20 and belt 21 driven by a motor (not shown) via a drive pulley 22. Four support rods or stand-off rods 23 extend upward from the pump housing 16 to a mounting plate 24, which holds bearings 25 for the shaft 17 and supports and positions the pump and fountain assembly 1. A heat shield 26 mounted on the rods 23 shields the bearings 25 from excessive heat of the molten solder in the main supply tank 3.

The fountain 5 includes a solder distributing chamber assembly 30, a vertical flow baffle chamber assembly 31, an outlet assembly 32, and an adjustable solder wave width controlling assembly 33.

A horizontally flowing stream of solder from the pump 4 and coupling passage 13 is received at the fountain inlet 14 as an entry to the solder distributing chamber assembly 30. Such chamber assembly 30, which is linear and has a tapered depth profile, as is shown in the preferred embodiment, is formed by an inclined ramp 34 as the bottom wall and side walls 35, 36 (FIG. 5). The ramp 34 is positioned to form a distribution chamber 37 of triangular shape elevation, as is seen in FIGS. 2 and 9, with the deepest portion thereof being proximate the fountain inlet 14 and the shallowest portion being at the remote end of the fountain relative to the inlet 14.

Turning to FIGS. 3–6, the vertical baffle chamber assembly 31 is shown in detail. The assembly 31 has a duct 39 formed by a plurality of vertical flow chambers 40 oriented as shown to deliver a vertical flow of solder from the distribution chamber 37 up to the fountain outlet 6. A pair of upstanding side walls 41, 42 and a plurality of vertically oriented baffles, vanes or diverters 43 between the side walls form the vertical flow chambers 40. The side walls are slightly angularly oriented such that the cross section of each flow chamber is generally of a truncated V-shape. The larger area at the top of each flow chamber 40 allows a gradual slowing and spreading of the solder flow therein for producing a solder wave of optimum size and minimum turbulence. Each baffle 43 is generally pillar-shape or candlestick-shape in having a base area 44 and a capital area 45 that are larger than the central or stem area 46, which itself is configured to fit preferably relatively snugly between the side walls 41, 42 to prevent or to minimize flow between chambers 40. Moreover, the side walls 41, 42 have lower flanges 47 for fastening to the solder distributing chamber assembly 30 (FIG. 5) and upper flanges 48 for fastening to the outlet assembly by the fasteners 52 shown. Slots 53 cut in the upper and lower corners of the side walls 41, 42 at the junctures with respective flanges receive the protruding tips 54, 55 of the baffle base and capital areas 44, 45 securely to hold the baffles in place between the side walls 41 and 42. Additionally, the baffles and side walls may be spot or tack welded for further security of structural integrity.

The bottom portions 56, and preferably the bottom edges 57 of the respective baffles 43, terminate in a common plane 58. Such plane 58 preferably is horizontal, above the ramp 34 and perpendicular to the plane of the drawing in FIGS. 4 and 5. Therefore, the ramp 34 and the bottom portions 56 of the baffles 43 cooperate to divert solder from the horizontal stream into the respective flow chambers 40 with substantially uniform distribution of solder in the several vertically directed streams therein passing up to the fountain outlet.

Referring back to FIG. 2, in the present invention the baffles 43 and particularly the bottom edges 57 thereof cooperate with the ramp 34 to act like individual cutting planes to cut into the solder flowing in the distribution chamber 37 to pick up discrete uniform amounts of solder directing the same into the respective flow chambers 40. The quantity of solder picked up by the baffles and passed through the respective flow chambers 40 will be a function of the slope of the ramp 34 forcing the solder stream into a narrower space or shallower depth as it flows, spacing of the respective baffles 43, and flow rate of the solder pumped by the pump 4. The baffles 43 convert the horizontal solder stream in the distribution chamber 37 to vertical streams. As the generally horizontal flow of solder passes through the distribution chamber 37, for example, from the left to the right as is shown in FIG. 2, the ramp 34 forces the solder up so that amounts thereof can be picked off by the respective baffles 43.

In the just described manner, uniform incremental amounts of solder will be picked up by the respective baffles and delivered into the respective flow chambers 40 at relatively accurately controlled rates. Accordingly, the amount of solder and the kinetic energy thereof flowing from the respective flow chambers 40 into the fountain outlet 6 will be substantially the same for each of the vertical solder flow streams of respective flow chambers so that distribution in the solder wave will be substantially uniform.

At the opposite ends of the fountain 5 are end plates 60, 61. The end plate 60 is connected to the vertical flow baffle chamber assembly 31, solder distributing chamber assembly 30, and the cast iron housing of the pump 4 at the coupling passage 13. The end plate 61 at the remote end of the fountain 5 relative to the pump 4 is fastened, too, to the distributing and baffle chamber assemblies 30, 31.

The fountain outlet 6 is that area of the fountain 5 at which the solder wave flows out from the fountain for soldering purposes. The outlet assembly 32 effects the ultimate formation of the wave for such outflow at the fountain outlet, and the width controlling assembly 33 adjusts the width of the solder wave.

Turning now to FIGS. 5–8, the outlet assembly 32 is formed by a pair of bars 62, 63, and a screen or perforated plate 64. The bars 62, 63 are elongate metal extrusions of, for example, stainless steel, that extend the width of the fountain 5 between the end plates 60, 61 and, if desired, wider. The bars 62, 63 are attached by the fasteners 52 to the respective flanges 48 of the fountain side walls 41, 42 and form a continuous outlet chamber 65 of the duct 39 directly above the vertical flow chambers 40. The screen 64 is held in the outlet chamber 65 by slots 66, 67 in the bars 62, 63 to provide a flow impedance and solder distributing function further to assure the uniformity of solder distribution in the solder wave and the non-turbulent flow in the wave.

The exterior top and side surfaces 70, 71 of the bars 62, 63 are smooth flowing generally from a horizontal surface area adjacent to the top of the duct outlet chamber 65 above the screen 64 and curving down to a vertically directed wall portion adjacent the respective bottoms thereof. Therefore, the solder flowing upward through the duct outlet 65 also flows over the surfaces 70, 71 with wave length then being a function of the spacing and shapes of the surfaces 70, 71 of the bars 62, 63 as well as of the solder flow rate. Moreover, as is seen most clearly in FIG. 5, the height of the bar 63, in particular, the highest level of the top surface level 63 relative to the screen 64, is greater than the height of the bar 62. Such height differential further enables a shaping of the wave so that a larger amount of solder will flow in the lefthand portion of the wave relative to the illustration of FIG. 5 than will pass in the righthand portion thereof. On the other hand, due to the higher elevation of the top surface 71 relative to the elevation of the surface 70, there will be a tendency of the top surface of the wave to be slightly sloped such that the righthand portion thereof will be slightly higher than the lefthand portion thereof relative to the illustration of FIG. 5. Therefore, it will be appreciated that by changing the relative heights of the surfaces 70, 71 of the bars 62, 63, the angular positioning of the wave as well as the flow distribution thereof may be controlled.

Flow deflector plates 72, 73 (FIG. 5) guide the solder flow from the wave at the surfaces 70, 71 back into the supply of molten solder contained in the main supply tank 3 for further recirculation back into wave by the wave soldering machine 1. The deflector plates 72, 73 are fastened to the bottom of each bar 62, 63 by fasteners 74. The deflector plates 72, 73 are shaped in a relatively gradual curve. The upper ends 75 of the deflector plates 72, 73, are substantially continuous with the vertical drop off of the respective surfaces 70, 71 of bars 62, 63; and lower ends 76 terminate preferably in a horizontal plane that ordinarily is below the surface level of the molten solder contained in the main supply tank 3. The flow continuity between the bar surfaces 70, 71 and the upper ends 75 of the deflector plates 72, 73 and the gradual curvature of the deflector plates 72, 73 between their upper and lower ends 75, 76 help to maintain flow continuity of the solder flow there minimizing turbulence prior to and upon re-entry into the main supply tank. The horizontal positioning of the lower deflector plate ends 76 brings such solder flow into the molten solder supply generally in a horizontal flow direction or vector. Therefore, entry of the solder flow into the solder supply is with a minimum of downward turbulence and motion altogether because of the energy dissipation and direction change effected by deflector plates 72, 73, thus minimizing dross formation and the drawing of impurities from the top surface of the molten solder down into the lower depths thereof. Purity of the solder in the wave is, accordingly, maintained at a very high level. Additionally, the possibility of splashing when the solder flows from the wave into the solder supply is minimized.

The solder wave width controlling assembly 33 may be adjusted to vary the lefthand (relative to FIG. 2) boundary of the solder wave. The righthand width boundary of the fountain outlet 6 and, thus, the wave is established by the upper portion 80 of the fountain end plate 61. Such assembly 33 shown in detail in FIGS. 2, 5, 7 and 8 to which attention now is directed includes a valve formed by a slide bar 81 beneath the screen 64. The assembly 33 also includes a top plate 82 above the screen, a slide block 83, and a slide plate 84. The slide plate 84 and the leading end 85 of the slide bar 81 facing the end plate portion 80 define the mentioned lefthand width boundary. The end plate portion 80 and slide plate 84 are adequately high and wide to assure adequate confinement of the wave therebetween. The slide block 83 is fastened to the top plate 82 near one end of the latter and is intended primarily to provide a mounting surface for the slide plate 84 and secondarily to provide a weighting function helping to hold down the top plate 82 into engagement with the top surface of the screen 64 minimizing flow of solder therebetween.

Lateral flange-like feet 88 at the bottom of the valve slide bar 81 slide in channels 89 in the respective bars 62, 63 to hold the bottom 90 in engagement with the flanges 48 and the top edges 91 of a selected number of baffles 43 substantially to seal the respective vertical flow chambers 40 covered by the slide bar. All or substantially all of the flow of solder through such covered flow chambers 40 to the duct outlet 65 is blocked; therefore, the solder flowing in the solder wave will be comprised substantially only by that solder flowing up through the vertical flow chambers 40 that are not covered by the slide bar 81.

Referring particularly to FIG. 2 again, the screen 64 extends over a width slightly greater than the total width of the fountain 5, i.e. from the end plate 61 to a location slightly beyond the end plate 60. The total length of the valve slide bar 81 and top plate 82 preferably are adequately long to allow movement of the width controlling assembly 33 to position the slide plate 84 and slide bar end 85 to the desired righthand most position to block flow from the desired maximum number of flow chambers 40. The top surface of the slide bar 81 and the bottom surface of the top plate 82 preferably both engage the screen 64, as is seen in FIGS. 5 and 8, in order to avoid an accumulation of solder in the screen or in gaps between the screen and the bar 81 or plate 82 at areas that the wave is not flowing. However, if desired, a gap may be provided, as is shown most clearly in FIG. 2, between the top of the slide bar and the bottom of the screen 64 to facilitate sliding of the slide bar. At the lefthand end (FIG. 2) of the slide bar 81 and top plate 82, the two are secured by a fastener 92 while being maintained in spaced relation by a spacer 93 to accommodate the screen in space 94. A slide support channel 95 mounted on the support rods 23 supports the assembled slide bar 81 and top plate 82. The solder wave width controlling assembly 33 may be adjustably slid in a lefthand or righthand direction, as is represented by the arrow 96, to effect adjustable control of the width of the solder wave produced at the fountain outlet 6. Such sliding of the width controlling assembly 33 may be effected by means 97, such as a conventional lead screw arrangement turned manually or automatically or by other means.

Figure 10:
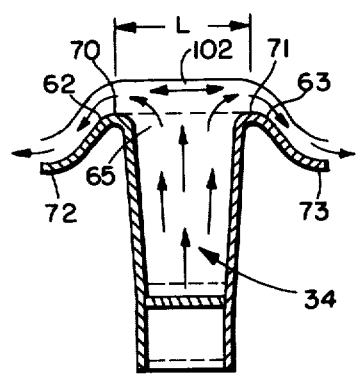

Turning now to FIGS. 9 and 10 in addition to FIG. 2, in using the wave soldering machine 1 initially heaters (not shown) are energized to melt the solder contained in the main supply tank 3 and in various portions of the pump and fountain assembly 2. After the solder is molten, the position of the adjustable solder wave width controlling assembly 33 may be adjusted to define a spacing between the end plate portion 80 and slide plate 84 of a size to provide a solder wave at the fountain outlet 6 of a desired width. The pump 4 is operated then to provide a substantially uniform flow stream 100 of solder through the coupling passage 13 to the inlet 14 of the fountain 5. The stream flow through the distribution chamber 37 is of adequate velocity and volume to form the discrete equal volume and flow velocity streams 101 that flow up through the chambers 40 of the duct 39 that are not blocked by the slide bar 81 thereby to create a wave 102 of the adjusted width. The solder directed up in the duct 39 rises above the upper surfaces 70, 71 of the bars 62, 63 (FIG. 5) at the outlet 6 creating a smooth horizontal wave of uniform height along its width W and uniform contour. The smoothness, i.e. non-turbulence, of the wave 102 effects efficient soldering and minimizes dross formation. The height or depth characteristic of the wave 102 at the fountain outlet 6 will be a function of pump speed, which controls volume and velocity of the solder being pumped. That solder flowing down the surfaces 70, 71 is smoothly guided by the deflector plates 72, 73 (FIG. 5) horizontally into the molten solder supply.

The movable valve slide bar plate 81 seals off progressive sections or chambers 40 of the area between the baffles 43 shutting off the upward flow of solder in these areas. Since the flow in such chambers 40 becomes static when the slide bar 81 closes them off, the flow from the pump 4 becomes laminar across the entrance area of each closed off flow chamber 40; an equal upward flow in each of the remaining open flow chambers 40 continues, though. The height of the baffles 43 should be such that the flow of liquid at the duct outlet 65 will be in essentially a vertical direction. Thus the height and contour of the portion of the wave effectively emanating from each of the flow chambers 40 will be identical. Since closing of any of the flow chambers 40 without charging the volume of liquid being pumped would result in a higher wave 102, an electronic control may be used to vary the pump displacement or speed to maintain constant height.

Since it is necessary to pump only that amount of solder needed to produce, for example, a solder wave of limited width, as opposed to a solder wave having a width commensurate with the entire width of the fountain 5, minimum energy is required for pumping. Additionally, since at the fountain there is heat loss primarily only at the controlled or limited area of the wave at the fountain outlet 6 rather than over the entire length of the fountain 5, total heat loss is reduced and, therefore, energy required to heat the solder is correspondingly reduced.

Figure 11:
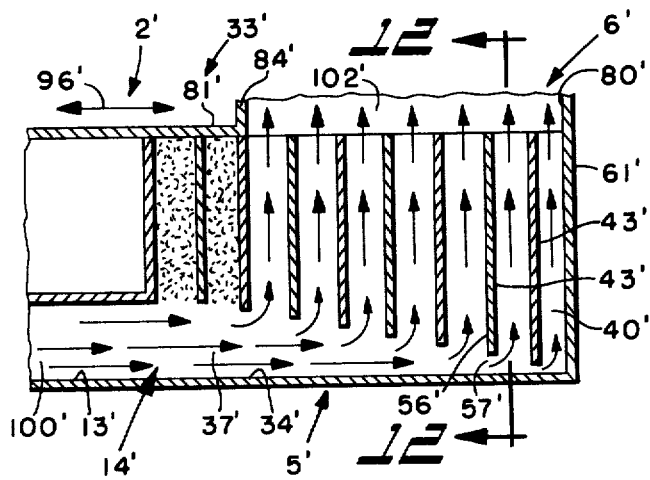
FIGS. 11 and 12 are schematic side and end views of a modified form of fountain showing flow therein.
Figure 12:
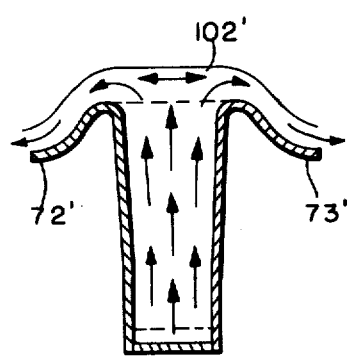

Briefly referring to FIGS. 11 and 12, wherein primed reference numerals refer to parts corresponding to those identified above by unprimed reference numerals, a modified fountain 5' is shown. In the modified fountain 5' the bottom wall 34' of the distribution chamber 37' is not sloped or ramp-like but rather is generally horizontal. However, the depth profile of the distribution chamber 37' still is tapered from the inlet 14' to the end plate 61' due to the graduated lengths of the baffles 43' and particularly the graduated staggered bottom portions 56' and edges 57'. Operation of the fountain 5', which may be substituted for the fountain 5 in the wave soldering machine 1, otherwise is substantially the same as that described above with respect to the fountain 5.

STATEMENT OF INDUSTRIAL APPLICATION

In view of the foregoing, it will be appreciated that the wave soldering machine 1 in accordance with the present invention may be used to effect high quality wave soldering functions while conserving energy and improving safety.

We claim:

1. A variable width solder wave generating apparatus, comprising means for producing a solder wave, including means for maintaining substantially uniform at least one of the height and contour of such solder wave substantially independently of the width thereof, and means for adjustably controlling the width of such solder wave, said means for producing comprising plural flow chamber means for directing vertically upward discrete solder streams to form such solder wave, and said means for adjustably controlling comprising valve means cooperative with said flow chamber means for blocking flow from selected ones of said flow chamber means, each of said flow chamber means having a top wall and said valve means comprising means for engaging said top wall of selected flow chamber means substantially to block flow of solder from the respective flow chamber means.

2. The apparatus of claim 1, said flow chamber means comprising a pair of side walls positioned in opposed generally vertically extending relation and plural baffle means between said side walls for dividing the area therebetween into respective flow chamber means.

3. The apparatus of claims 1 or 2, said valve means comprising a substantially solid bar-like member slidable along said top walls and said means for engaging comprising the bottom surface of said member positionable in engagement with said side walls and with top walls of respective baffle means.

4. The apparatus of claim 2, further comprising screen-like means for distributing solder from said flow chamber means to form such solder wave, means for supporting said screen-like means above said top walls of said flow chamber means, said valve means comprising a substantially solid bar-like member slidable along said top walls and positioned between said screen-like means and said top walls.

5. The apparatus of claim 4, said means for engaging comprising the bottom surface of said member positionable in engagement with said side walls and with the top walls of respective baffle means, and said valve means further comprising a plate slidable on the top of said screen-like means and means for securing said bar-like member and said plate for common sliding movement thereof, and slide plate means at least proximate the end of said plate and movable therewith for forming a boundary of such solder wave.

6. The apparatus of claim 1, said means for producing comprising an elongate duct, and further comprising means for delivering a generally horizontal stream of solder to said duct, baffle means in said duct for intercepting discrete portions of such stream of solder vertically through said flow chamber means.

7. The apparatus of claim 6, said duct having an outlet at which such wave is formed, and said duct having an end wall portion extending above said outlet to form one boundary for such wave, and further comprising a slide plate means movable with said valve member for forming a boundary of such wave at the opposite end thereof relative to said end wall portion.

8. The apparatus of claim 2, said side walls being positioned to form in cross section a truncated V-shape duct, and said baffle means comprising a plurality of candlestick-shape walls held in position between said side walls.

9. A wave producing apparatus comprising a liquid wave generator means for producing a liquid wave including plural flow chamber means for directing vertically upward discrete solder streams to form such solder wave, said flow chamber means having top walls and side walls, and means for adjustably controlling the width of such wave including valve means cooperative with said flow chamber means for blocking flow from selected ones of said flow chamber means, and means for effecting relative movement between said valve means and such generator to enable said valve means to block controlled amounts of liquid flow thereby to control the width of such wave, said valve means comprising a substantially solid bar-like member slidable along said top walls of said flow chamber means and having a bottom surface positionable in engagement with at least part of at least some of said side walls and top walls of said flow chamber means.

10. The apparatus of claim 1, further comprising a main supply tank for containing a recirculating supply of liquid, such wave being produced by a liquid wave producing fountain at least partly contained in said main supply tank for producing a wave of such liquid at a location above the surface level of liquid contained in said main supply tank, and curved return means for returning liquid from such wave in a substantially laminar flow to such liquid contained in said main supply tank.

11. The apparatus of claim 1, further comprising a main supply tank for containing a recirculating supply of liquid, such wave being produced by a liquid wave producing fountain at least partly contained in said main supply tank for producing a wave of such liquid at a location above the surface level of liquid contained in said main supply tank, and return means for directing liquid from such wave into the liquid contained in said main supply tank at or near the surface thereof in a flow direction that has a substantial non-vertical vector complement.

12. A liquid wave generator, comprising inlet means for receiving a generally horizontally flowing stream of liquid, outlet means for conducting a wave-like flow of liquid thereat, plural directing means for directing a flow of liquid in a generally vertical direction to said outlet means, and distributing means for conducting such horizontally flowing stream of liquid to said directing means, said directing means including intercept means for intercepting different respective top portions of such horizontally flowing stream conducted by said distributing means and to lead such intercepted portions into said respective directing means for vertical flow to said outlet means, and further comprising a flow duct, said directing means comprising plural baffles vertically positioned in said flow duct, said baffles having bottom edges positioned to establish the upper boundary of said distributing means, and said distributing means having side walls and a sloping bottom wall.

13. A liquid wave fountain, comprising inlet means for receiving a generally horizontally flowing stream of liquid, outlet means for conducting a wave-like flow of liquid thereat, a plurality of directing means for intercepting such horizontally flowing stream at selected locations therealong and conducting such intercepted liquid in a generally vertical direction to said outlet means, said directing means being of a vertical size and relative spacing to cause at least substantial elimination from the liquid conducted vertically any horizontally directed flow component therefrom proximate said outlet means, and further comprising distributing means for conducting such horizontally flowing stream of liquid from said inlet means to said directing means to distribute amounts of liquid received from said inlet means to said directing means, said distributing means including means for decreasing the depth dimension of such stream of liquid along the flow path thereof, and further comprising a flow duct, said directing means comprising plural baffles vertically positioned in said flow duct, said baffles having bottom edges positioned to establish the upper boundary of said distributing means, and said distributing means having side walls and a sloping bottom wall.

14. A liquid wave generator, comprising inlet means for receiving a stream of liquid flowing substantially in a non-vertical direction, outlet means for conducting a wave-like flow of liquid thereat, plural spaced apart directing means for directing a flow of liquid in a generally vertical direction to said outlet means, and distributing means for conducting such stream of liquid to said directing means to distribute amounts of liquid received from said inlet means to said directing means, said directing means and distributing means being cooperatively positioned and interrelated for decreasing the effective depth dimension of such stream of liquid along the flow path thereof, and further comprising a flow duct, said directing means comprising plural baffles vertically positioned in said flow duct, said baffles having bottom edges positioned to establish the upper boundary of said distributing means, and said distributing means having side walls and a sloping bottom wall.

15. The apparatus of claims 9, 13 or 14, such liquid comprising molten solder.

16. The apparatus of claims 12, 13 or 14, said bottom edges terminating in a common horizontal plane above said sloping bottom wall to form a tapered flow path for such stream of liquid having a maximum depth proximate said inlet means and a minimum depth at the end of said duct remote from said inlet means.

17. The apparatus of claims 12, 13 or 14, further comprising means for adjustably controlling the width of such liquid wave.

18. The apparatus of claim 17, said directing means having a top wall portion, and said means for adjustably controlling comprising valve means for engaging said top wall portion substantially to block flow of solder from selected portions of said directing means.

19. The apparatus of claim 18, further comprising screen-like means for distributing solder from said directing means to form such solder wave at said outlet means, means for supporting said screen-like means above said top wall portion, and said valve means comprising a substantially solid bar-like member slidable along said top wall portion.

20. The apparatus of claim 18, further comprising smoothly curved wall portions at said outlet means for conducting the flow of liquid thereat to form such wave.

21. The apparatus of claims 12, 13 or 14, further comprising pump means for pumping a stream of liquid to said inlet means.

22. A liquid wave generator, comprising inlet means for receiving a generally horizontally flowing stream of liquid, outlet means for conducting a wave-like flow of liquid thereat, plural directing means for directing a flow of liquid in a generally vertical direction to said outlet means, and distributing means for conducting such horizontally flowing stream of liquid to said directing means, said directing means including intercept means for intercepting respective top portions of such horizontally flowing stream conducted by said distributing means and to lead such intercepted portions into said respective directing means for vertical flow to said outlet means, said distributing means having a tapered effective profile to create effectively a tapered depth profile for such stream of liquid, said tapering depth profile being formed by plural directing means of staggered increasing length protruding into said distributing means.

23. A liquid wave fountain, comprising inlet means for receiving a generally horizontally flowing stream of liquid, outlet means for conducting a wave-like flow of liquid thereat, a plurality of directing means for intercepting such horizontally flowing stream at selected locations therealong and conducting such intercepted liquid in a generally vertical direction to said outlet means, said directing means being of a vertical size and relative spacing to cause at least substantial elimination from the liquid conducted vertically any horizontally directed flow component therefrom proximate said outlet means, and further comprising distributing means for conducting such horizontally flowing stream of liquid from said inlet means to said directing means to distribute amounts of liquid received from said inlet means to said directing means, said distributing means including means for decreasing the depth dimension of such stream of liquid along the flow path thereof, said distributing means having a tapered effective profile to create effectively a tapered depth profile for such stream of liquid, said tapering depth profile being formed by plural directing means of staggered increasing length protruding into said distributing means.

24. A liquid wave generator, comprising inlet means for receiving a stream of liquid flowing substantially in a non-vertical direction, outlet means for conducting a wave-like flow of liquid thereat, plural spaced apart directing means for directing a flow of liquid in a generally vertical direction to said outlet means, and distributing means for conducting such stream of liquid to said directing means to distribute amounts of liquid received from said inlet means to said directing means, said directing means and distributing means being cooperatively positioned and interrelated for decreasing the effective depth dimension of such stream of liquid along the flow path thereof, said distributing means having a tapered effective profile to create effectively a tapered depth profile for such stream of liquid, said tapering depth profile being formed by plural directing means of staggered increasing length protruding into said distributing means.

25. The apparatus of claim 21, further comprising a main supply tank for containing a recirculating supply of liquid, and return means for directing liquid from such wave into the liquid contained in said main supply tank at or near the surface thereof in a flow direction that has a substantial non-vertical vector component.

26. A liquid wave producing machine, comprising a main supply tank for containing a recirculating supply of liquid, a liquid wave producing fountain at least partly contained in said main supply tank for producing a wave of such liquid at a location above the surface level of liquid contained in said main supply tank, and return means for directing liquid from such wave into the liquid contained in said main supply tank at or near the surface thereof in a flow direction that is substantially parallel to such surface said return means including an end surface area portion positioned in substantially parallel relation to and below the surface of such liquid in said main supply tank, said fountain comprising an elongate duct, means for delivering a generally horizontal stream of solder to said duct, baffle means in said duct for intercepting discrete portions of such stream of solder vertically, and means for adjustably controlling the width of the solder flow out of said fountain comprising a valve member slidable along said elongate duct selectively to open and to block flow of respective vertically directed portions.

27. The machine of claim 26, said return means comprising a curved surface area having an upstream end positioned to receive liquid from such wave, and said end surface area portion being located at a relatively downstream end of said surface area to discharge liquid into the liquid contained in said main supply tank in a flow direction that is substantially parallel to such surface of such liquid in said main supply tank.

28. The machine of claims 26 or 27, further comprising curved bars at the top of said duct for conducting a flow of liquid therealong to form such wave.

29. The machine of claim 28, said return means comprising surface areas positioned to have substantial continuity with adjacent surface areas of said bars.

30. The apparatus of claims 1, 12, or 26, further comprising an impeller pump comprising a pump housing, an impeller rotatable in said housing about an axis, a fluid inlet to said housing and a fluid outlet from said housing, and said impeller having tapered blade means for pumping fluid from said inlet to said outlet to produce a generally uniform output fluid stream at said outlet.

31. The apparatus of claim 30, further comprising means for mounting said impeller for rotation about a substantially vertical axis, said inlet being at the bottom of said housing substantially aligned with such axis, said outlet being at a side of said housing to conduct such output fluid stream generally transverse to such axis, and said blade means comprising plural blades that taper from a relatively small length generally radially relative to such axis proximate such inlet to a relatively large length relatively remote from such inlet.

32. A solder wave generator, comprising a solder distributing chamber having an inlet means for receiving a generally horizontally flowing stream of solder, and a ramp means sloping upward from a location relatively proximate said inlet means toward the opposite end of said distributing chamber for decreasing the depth thereof, plural vertical flow chambers respectively located in positions spaced along at least part of and above said distributing chamber to pick up from the latter at least approximately equal amounts of solder flowing at approximately equal kinetic energy levels, whereby solder flows upward through respective flow chambers, and outlet means receiving solder flowing up through said flow chambers for delivering such solder as a solder wave.

33. The generator of claim 32, further comprising means for adjusting the width of such solder wave.

34. The generator of claim 32, further comprising a main supply tank for containing a recirculating supply of solder, and curved return means for returning solder from such wave in a substantially laminar flow to such solder contained in said main supply tank.

35. The generator of claim 32, further comprising a main supply tank for containing a recirculating supply of solder, and return means for directing solder from such wave into the solder contained in said main supply tank at or near the surface thereof in a flow direction that is substantially parallel to such surface.

36. The generator of claim 32, further comprising an impeller pump means for producing such generally horizontally flowing stream of solder, said pump including a pump housing, an impeller rotatable in said housing about an axis, a fluid inlet to said housing and a fluid outlet from said housing, and said impeller having tapered blade means for pumping solder from said fluid inlet to said fluid outlet to produce a generally uniform output fluid stream at said outlet.

37. The generator of claim 36, further comprising means for mounting said impeller for rotation about a substantially vertical axis, said fluid inlet being at the bottom of said housing substantially aligned with such axis, said fluid outlet being at a side of said housing to conduct such horizontally flowing stream of solder generally transverse to such axis, and said blade means comprising plural blades that taper from a relatively small length generally radially relative to such axis proximate such fluid inlet to a relatively large length relatively remote from such fluid inlet.

38. The generator of claim 32, said flow chambers being of equal area in the cross-section thereof taken perpendicularly to the direction of solder flow therethrough.

39. The generator of claim 38, said flow chambers being of equal cross-sectional dimensions in the direction perpendicular to the direction of solder flow therethrough and being equally spaced along said distributing chamber.

40. A solder wave generator, comprising a solder distributing chamber having an inlet means for receiving a generally horizontally flowing stream of solder, and a ramp means sloping upward from a location relatively proximate said inlet means toward the opposite end of said distributing chamber for decreasing the depth thereof, a main vertical flow duct means for receiving solder from said distributing chamber, plural vane means for dividing said duct means into plural vertical flow chambers respectively located in positions spaced along at least part of and above said distributing chamber to pick up from the latter at least approximately equal amounts of solder flowing at approximately equal kinetic energy levels and to direct such flowing solder upward through respective flow chambers, and outlet means receiving solder flowing up through said flow chambers and out from the top of said duct means for delivering such solder as a solder wave.

* * * * *